Figure 1:
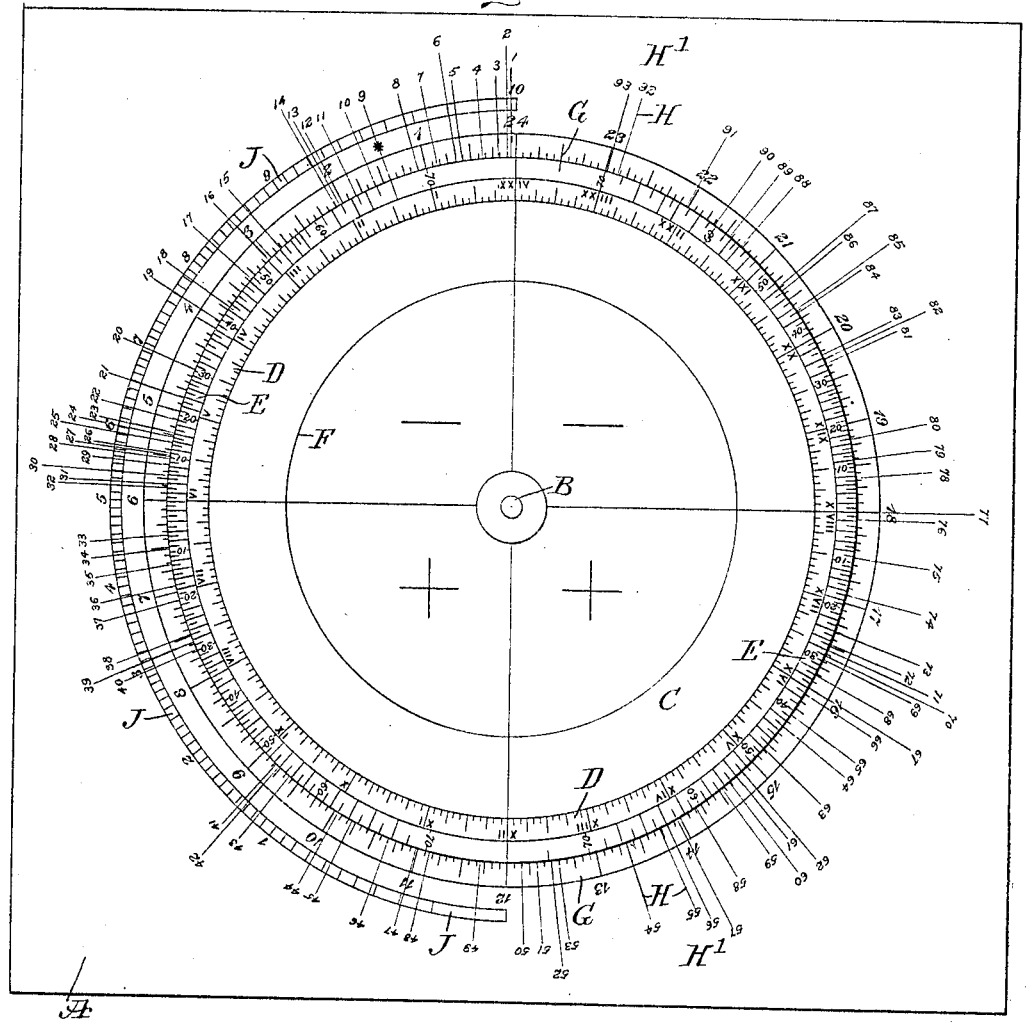

No. 856,912. PATENTED JUNE 11, 1907.
J. T. ROGERS & W. H. RIDINGS.
STAR FINDER.
APPLICATION FILED AUG. 28, 1906.

5 SHEETS—SHEET 1.

WITNESSES
O. C. Abbott
Geo. J. Hoskins

INVENTORS
Joseph T. Rogers
William H. Ridings
BY Munn & Co.
ATTORNEYS

Fig. 3.

| Stars | R.A. h. m. s. | Decl. ° ′ ″ | Stars | R.A. h. m. s. | Decl. ° ′ ″ |
|---|---|---|---|---|---|
| 1. α Andromeda | 0. 3. 32 | + 28. 34. 17 | 51. α Crucis | 12. 21. 22 | − 62. 34. 41 |
| 2. β Cassiopeia | 0. 4. 9 | + 58. 37. 53 | 52. β Corvi | 12. 29. 27 | − 22. 52. 37 |
| 3. γ Pegasi (Algenib) | 0. 8. 24 | + 14. 39. 40 | 53. δ Virginis | 12. 36. 54 | − 0. 56. 02 |
| 4. β Hydri | 0. 20. 49 | − 77. 47. 01 | 54. α " (Spica) | 13. 20. 14 | − 10. 40. 15 |
| 5. α Cassiopeiae | 0. 35. 10 | + 56. 1. 19 | 55. η Ursae Majoris | 13. 43. 50 | + 49. 46. 56 |
| 6. β Ceti | 0. 38. 52 | − 18. 30. 9 | 56. η Bootis | 13. 50. 12 | + 18. 52. 07 |
| 7. γ Cassiopeiae | 0. 51. 02 | + 60. 12. 28 | 57. β Centauri | 13. 57. 11 | − 59. 55. 11 |
| 8. β Andromeda | 1. 4. 28 | + 35. 7. 20 | 58. α Bootis (Arcturus) | 14. 11. 22 | + 19. 40. 17 |
| 9. Polaris | 1. 23. 08 | + 88. 46. 19 | 59. α Centauri | 14. 33. 12 | − 60. 26. 52 |
| 10. α Eridani (Achernar) | 1. 34. 13 | − 57. 42. 51 | 60. ε Bootis | 14. 40. 53 | + 27. 28. 13 |
| 11. β Aretis | 1. 49. 27 | + 20. 20. 56 | 61. α Librae | 14. 45. 41 | − 15. 39. 05 |
| 12. γ Andromeda | 1. 58. 07 | + 41. 52. 44 | 62. β Ursae Minoris | 14. 50. 58 | + 74. 32. 23 |
| 13. α Aretis | 2. 1. 52 | + 23. 1. 06 | 63. β Librae | 15. 11. 57 | − 9. 2. 11 |
| 14. β Trianguli | 2. 3. 57 | + 34. 32. 35 | 64. α Coronae Borealis | 15. 30. 42 | + 27. 1. 50 |
| 15. α Ceti | 2. 57. 22 | + 3. 43. 17 | 65. α Serpentis | 15. 39. 38 | + 6. 43. 15 |
| 16. β Persei (Algol) | 3. 2. 03 | + 40. 35. 38 | 66. δ Scorpii | 15. 54. 46 | − 22. 21. 16 |
| 17. α Persei | 3. 17. 36 | + 49. 51. 38 | 67. β " | 15. 58. 58 | − 19. 32. 54 |
| 18. η Tauri | 3. 41. 54 | + 23. 48. 53 | 68. δ Ophinchi | 16. 9. 25 | − 3. 27. 10 |
| 19. γ Eridani | 3. 53. 39 | − 13. 46. 32 | 69. η Draconis | 16. 22. 43 | + 61. 43. 36 |
| 20. α Tauri (Aldebaron) | 4. 30. 32 | + 16. 19. 15 | 70. α Scorpii (Antares) | 16. 23. 38 | − 26. 13. 25 |
| 21. ι Aurigae | 4. 50. 52 | + 33. 1. 4 | 71. β Herculis | 16. 26. 10 | + 21. 41. 38 |
| 22. β Eridani | 5. 3. 14 | − 5. 12. 27 | 72. ε Ophinchi | 16. 31. 59 | − 10. 27. 38 |
| 23. α Aurigae (Capella) | 5. 9. 45 | + 45. 54. 10 | 73. α Trianguli Australis | 16. 38. 42 | − 68. 51. 21 |
| 24. β Orionis (Rigel) | 5. 10. 01 | − 8. 18. 35 | 74. η Ophinchi | 17. 4. 59 | − 15. 36. 32 |
| 25. β Tauri | 5. 20. 21 | + 28. 31. 43 | 75. α " | 17. 30. 34 | − 12. 37. 41 |
| 26. δ Orionis | 5. 27. 12 | − 0. 22. 6 | 76. δ Draconis | 17. 54. 25 | + 51. 29. 59 |
| 27. α Leporis | 5. 28. 35 | − 17. 53. 21 | 77. γ Sagittarii | 17. 59. 46 | − 30. 25. 32 |
| 28. ε Orionis | 5. 31. 26 | − 1. 15. 41 | 78. η " | 18. 22. 10 | − 25. 28. 27 |
| 29. α Columbae | 5. 36. 15 | − 34. 7. 26 | 79. α Lyrae (Vega) | 18. 33. 45 | + 38. 41. 45 |
| 30. κ Orionis | 5. 43. 18 | − 9. 42. 9 | 80. ε Sagittarii | 18. 49. 26 | − 26. 24. 50 |
| 31. α Orionis (Betelguese) | 5. 50. 05 | + 7. 23. 24 | 81. γ Aguilae | 19. 41. 47 | + 10. 23. 01 |
| 32. β Aurigae | 5. 52. 38 | + 44. 56. 18 | 82. δ Cygni | 19. 42. 3 | + 44. 54. 03 |
| 33. α Argus (Canopus) | 6. 21. 52 | − 52. 38. 39 | 83. α Aguilae (Altair) | 19. 46. 12 | + 8. 37. 11 |
| 34. γ Germinorum | 6. 32. 17 | + 16. 18. 48 | 84. α Pavonis | 20. 18. 13 | − 57. 2. 12 |
| 35. α Canis Maj. (Sirius) | 6. 41. 00 | − 16. 35. 13 | 85. γ Cygni | 20. 18. 51 | + 39. 57. 20 |
| 36. ε Canis Majoris | 6. 54. 56 | − 28. 50. 37 | 86. α " | 20. 38. 14 | + 44. 56. 39 |
| 37. δ " | 7. 4. 34 | − 26. 14. 37 | 87. ε " | 20. 42. 24 | + 33. 37. 04 |
| 38. α Geminorum (Castor) | 7. 28. 36 | + 32. 5. 43 | 88. α Cephei | 21. 16. 20 | + 62. 11. 14 |
| 39. α Canis (Procyon) | 7. 34. 22 | + 5. 27. 58 | 89. β Aquari | 21. 26. 37 | − 5. 59. 06 |
| 40. β Germinorum (Pollux) | 7. 39. 34 | + 28. 15. 13 | 90. ε Pegasi | 21. 39. 34 | + 9. 26. 37 |
| 41. β Argus | 9. 12. 10 | − 69. 19. 48 | 91. α Gruis | 22. 2. 18 | − 47. 25. 00 |
| 42. ι " | 9. 14. 34 | − 58. 52. 50 | 92. α Pis. Austr. (Fom) | 22. 52. 27 | − 30. 7. 14 |
| 43. α Hydrae | 9. 22. 58 | − 8. 15. 3 | 93. α Pegasi (Markab) | 23. 0. 05 | + 14. 41. 58 |
| 44. α Leonis (Regulus) | 10. 3. 22 | + 12. 25. 37 | | | |
| 45. γ " | 10. 14. 47 | + 20. 19. 02 | | | |
| 46. η Argus | 10. 41. 24 | − 59. 11. 25 | | | |
| 47. α Ursar Majoris | 10. 57. 56 | + 62. 15. 31 | | | |
| 48. δ Leonis | 11. 9. 7 | + 21. 2. 20 | | | |
| 49. β " | 11. 44. 16 | + 15. 5. 51 | | | |
| 50. γ Corvi | 12. 10. 58 | − 17. 1. 12 | | | |

No. 856,912. PATENTED JUNE 11, 1907.
J. T. ROGERS & W. H. RIDINGS.
STAR FINDER.
APPLICATION FILED AUG. 28, 1906.

5 SHEETS—SHEET 3.

WITNESSES

INVENTORS
Joseph T. Rogers
William H. Ridings
BY

ATTORNEYS

No. 856,912. PATENTED JUNE 11, 1907.
J. T. ROGERS & W. H. RIDINGS.
STAR FINDER.
APPLICATION FILED AUG. 28, 1906.

5 SHEETS—SHEET 4.

WITNESSES

INVENTORS
Joseph T. Rogers
William H. Ridings
BY
ATTORNEYS

No. 856,912. PATENTED JUNE 11, 1907.
J. T. ROGERS & W. H. RIDINGS.
STAR FINDER.
APPLICATION FILED AUG. 28, 1906.

5 SHEETS—SHEET 5.

WITNESSES

INVENTORS
Joseph T. Rogers
William H. Ridings
BY
ATTORNEYS

UNITED STATES PATENT OFFICE.

JOSEPH T. ROGERS, OF NEW YORK, N. Y., AND WILLIAM H. RIDINGS, OF MILWAUKEE, WISCONSIN.

STAR-FINDER.

No. 856,912.   Specification of Letters Patent.   Patented June 11, 1907.

Application filed August 28, 1906. Serial No. 332,342.

*To all whom it may concern:*

Be it known that we, JOSEPH T. ROGERS, of the United States Mercantile Marine, a citizen of the United States, and a resident of the city of New York, borough of Brooklyn, in the county of Kings and State of New York, and WILLIAM H. RIDINGS, of the United States Mercantile Marine, a citizen of the United States, and a resident of Milwaukee, in the county of Milwaukee and State of Wisconsin, have invented a new and Improved Star-Finder, of which the following is a full, clear, and exact description.

The invention relates to astronomical instruments, and its object is to provide a new and improved star finder more especially designed for the use of mariners and other persons, and arranged to enable a person to tell at a glance which stars in the heavens are most favorably located at a given time for making observations, without requiring tedious calculations; to give the shortest formula for working out the longitude and the latitude by the simultaneous altitude of two different stars, and to find the deviation of the compass by the bearing of the stars, the planets or the moon.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 2:
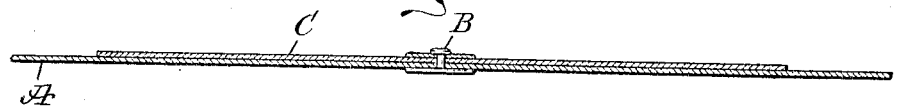
Figure 4:
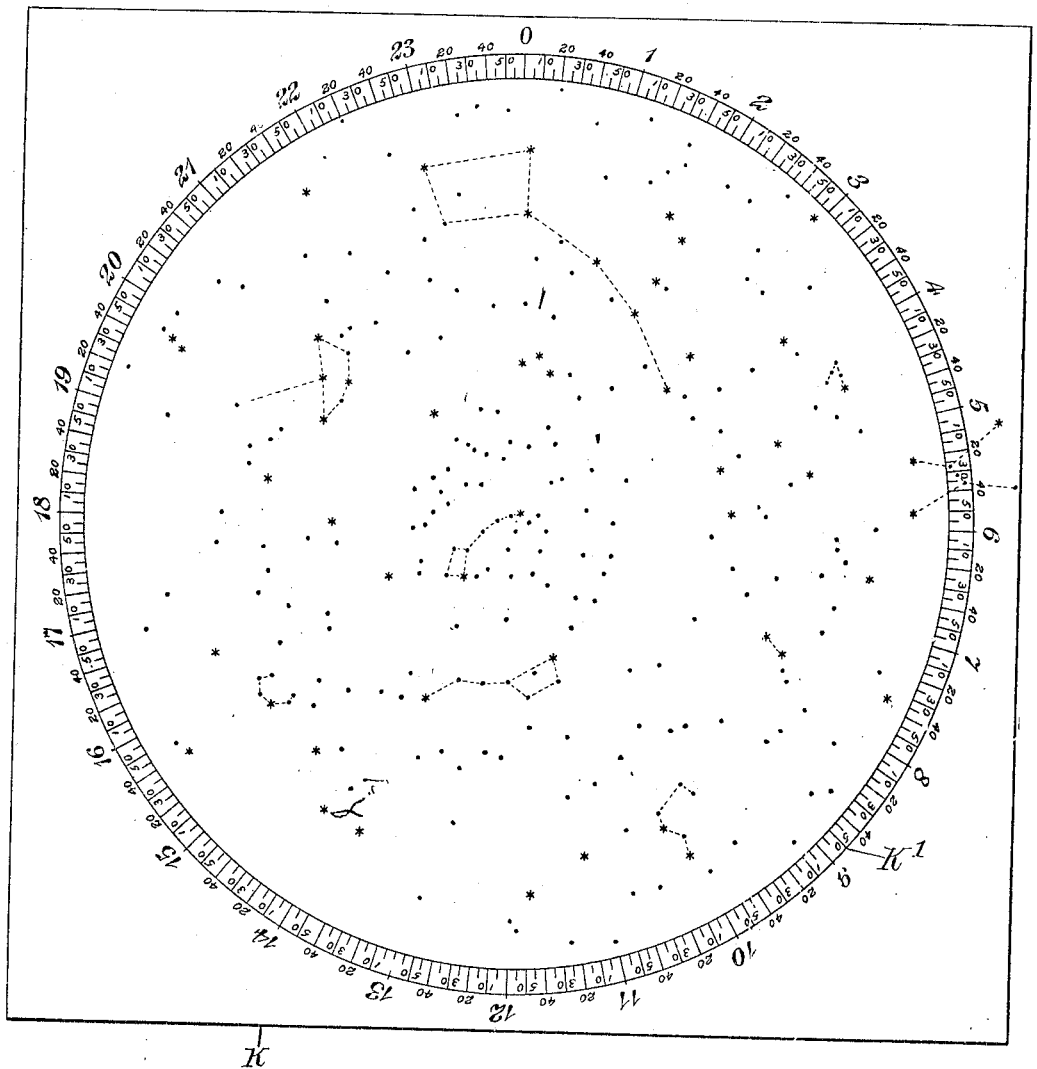
Figure 5:
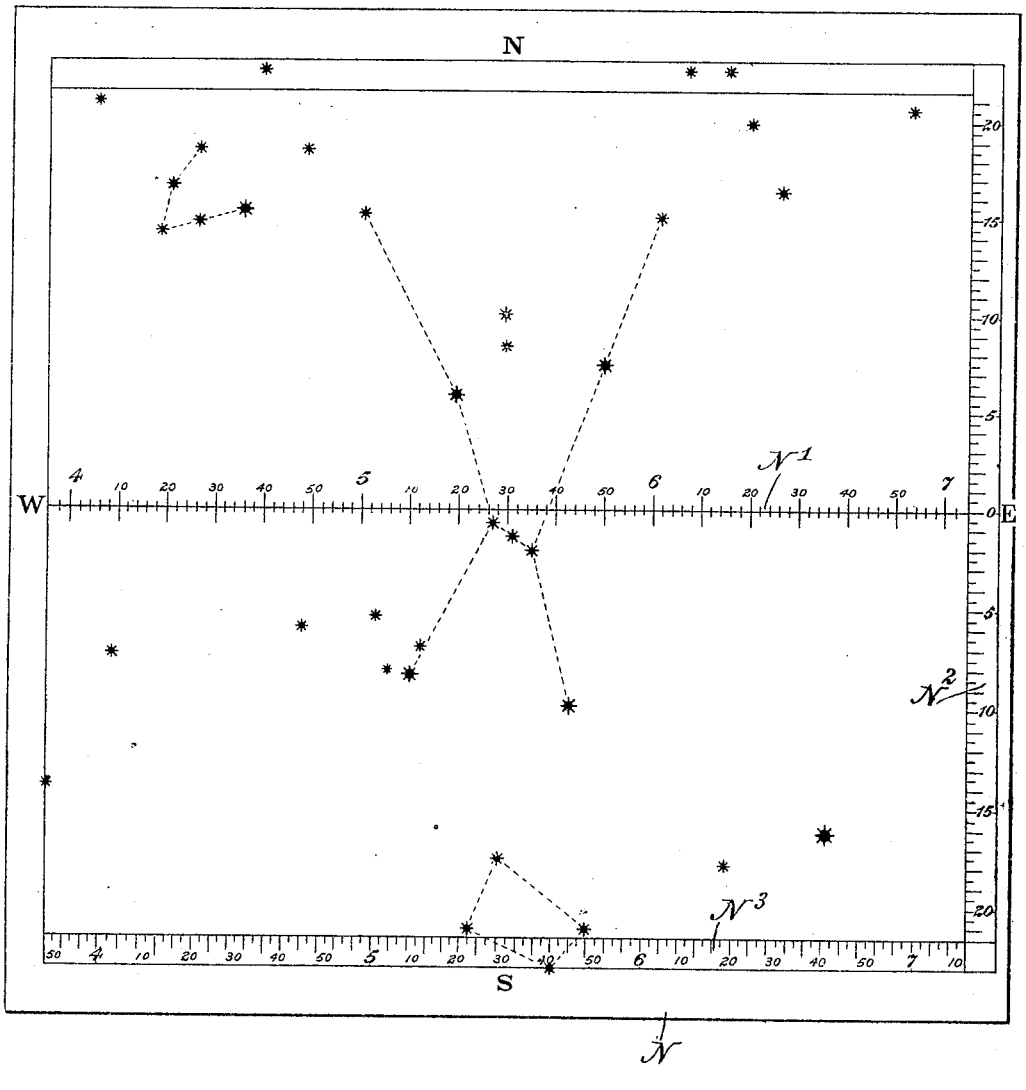
Figure 6:
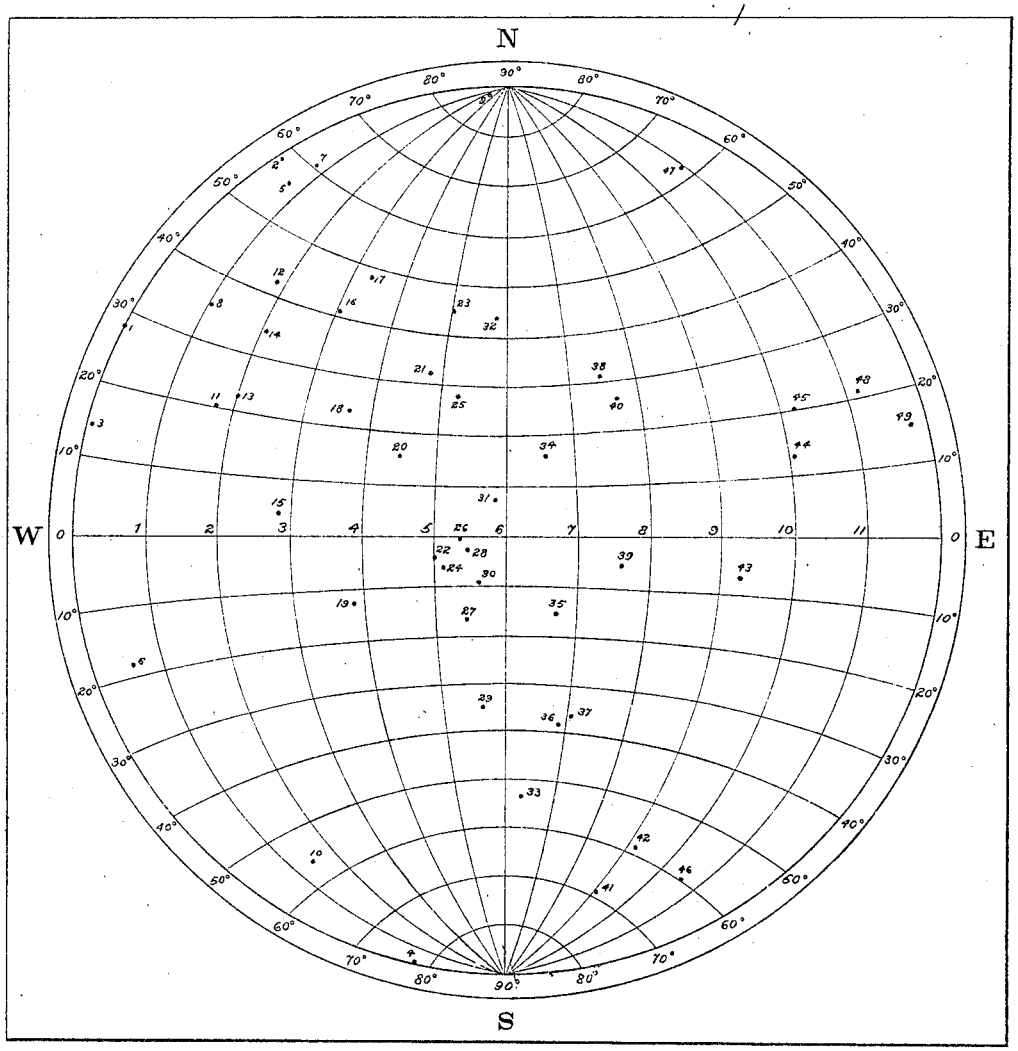

Figure 1 is a plan view of the improvement; Fig. 2 is an edge view of the same; Fig. 3 is a table giving the names of the stars, their numbers and right ascension and declination; Fig. 4 is a plan view of a celestial chart showing the northern hemisphere; Fig. 5 is a plan view of a chart showing the constellation of Orion and adjacent stars; Fig. 6 is a plan view of a hemisphere chart.

A plate A of suitable material is provided with a pivot B on which is mounted to turn a disk C provided on its face with an annular graduation D indicating the hours of the day, but arranged in the opposite way to those on a clock dial or vice versa. Concentric with the graduation D is a minute graduation E which is a correction plus or minus according to the quadrant which it is in, and it is to be applied to the altitude of the polar star and is computed for declination 88° 48' 19" N. On the face of the disk C is also arranged another graduation F for a second correction. The disk C is also divided into quadrants having plus and minus signs, as plainly indicated in Fig. 1. On the face of the plate A adjacent to the edge of the disk C is an annular graduation G indicating right ascension and having the hours marked thereon and the graduation divided to every five minutes of the arc. On the plate A are arranged radial lines H leading to the edge of the disk C and provided at their outer ends with numerals H' corresponding to similar numerals I' opposite the names of the principal stars contained in a table I, such as shown in Fig. 3, and which table also gives the right ascension and declination of the said stars. Thus, for instance, by reference to Fig. 1, it will be seen that the line H having the numeral 9 indicates that it represents the polar star (Polaris) as given opposite the same numeral 9 in the table shown in Fig. 3. On the face of the plate A is also arranged a semicircular graduation J which gives approximate correction of soundings based upon a rise and fall of ten feet above mean low water at regular tides this however forming no part of the invention claimed.

The star finder is used as follows. To find the time of any star passing the meridian, it is necessary for the operator to turn the disk C until zero (XXIV.) is on the right ascension of the apparent sun for the given date, and the apparent time of each star passing the meridian will be shown on the graduation D. In order to find which star is on the meridian at a certain time, say 6.00 p.m. of February 5, 1906, it is necessary to find the right ascension 20h. 58m. 54s. and accelerate for the Greenwich time according to the longitude; for example, the longitude being 130° W. = 8h. 40m. plus ship time 6h. = 14h. 40m Greenwich mean time acceleration = 2m. 24s. which added to 20h. 58m. 54s. = 21h. 01m. 18s. plus ship time 6h. = 27h. 01m. 18s. − 24h. = 3h. 01m. 18s. right ascension of the meridian. The operator now turns the disk C until zero (XXIV.) coincides on the graduation G at 3.1, and at this point we find line H, numbered 16, to be within one minute of the meridian. Now, as the numeral 16 on the line H corresponds with the numeral 16 on the table shown in Fig. 3, we find the name of the star to be B. Persei (Algol) and the latter's right ascension and declination. For approximate work it is only necessary to add to the ship's time of six hours, 21h. (right ascension) $-24=3$h. right ascension of meridian, to which the disk C is turned to obtain the nearest line H which in the case mentioned is 16. In order to find which stars will be in position for longitude at a certain time, it is necessary to find the right ascension of meridian on the graduation G, and to the place thus found is turned the zero mark of the graduation D on the disk C. Now, all the stars represented by the lines H between zero and VI. hours will be east, and all stars represented by the lines H between zero and XVIII. will be west. The operator now chooses those bearing nearest to east or west between II. and V. hours from zero on the graduation D.

In order to find the time of a star passing the meridian, the following example is given: On June 15, 1906. Required, at what time the star a Bootis (Acturus star line, No. 58) will be in the meridian. From the *Nautical Almanac* take out the sun's right ascension for the given date $=5$h. 31m. 26s. Now turn disk C until zero on disk points to 5h. 31m. 26s. on the graduation G, then find star line H, number 58, which cuts the graduation D at 8h. 41m., the required time of the star passing the meridian. It is p. m. because the right ascension of 58, 14h. 11m. on graduation D is greater than the sun's right ascension for the given day. Required, what stars will be in position for longitude at 8 p. m. (mean time at ship) June 15th, 1906, in longitude 120° W. To the sun's right ascension for June 15th $=5$h. 31m. 26s. $+8$ h. (M. T. S.) $+$ acceleration (table III *Nautical Almanac*) $=13$h. 34m. 4s. right ascension of the meridian.

|  | Hrs. | Min. | Sec. |
|---|---|---|---|
| Sun's R. A. = | 5 | 31 | 26 |
| M. T. S. = | 8 | 00 | 00 |
|  | 13 | 31 | 26 |
| Acceleration for 16h. G. M. T. | + | 2 | 38 |
|  | 13 | 34 | 04 |

Longitude 120° W $=8$h.

|  | Hrs. | Min. | Sec. |
|---|---|---|---|
| Longitude in time = | 8 | 0 | 0 |
| M. T. S. = | 8 | 0 | 0 |
| G. M. T. = | 16 | 0 | 0 |

Then turn to zero on the disk C to 13 hrs. 34 min. 04 sec. on the graduation G. Now all the stars represented by the lines H between zero and VI. hrs. will be east, and all stars represented by the lines H between zero and XVIII. will be west.

To find the correction for the polar star, it is necessary for the operator to turn the disk C from zero to the right ascension of meridian, and the correction will be found in minutes taken from XVIII. to zero, from VI. hours to zero, from XVIII. to XII. and from VI. hours to XII., and the amount will be plus or minus according to the plus or minus signs of the quadrant in which the polar star (line 9) falls. The following mode will be found very expedient for setting a sextant for twilight observations. First, compute the latitude by dead reckoning, and with the right ascension of the meridian find the correction, which apply to the latitude the opposite way to the sign plus or minus of the quadrant in which the correction is found.

In practice it is desirable to arrange the apparatus in book form, that is, one of the covers forms the plate A on which the disk C is mounted and the book is also provided with the table I, shown in Fig. 3, and with two star charts K, one for the northern hemisphere, shown in Fig. 4, and one for the southern hemisphere. The book also contains three charts L of hemispheres from the North Pole to the South Pole, each embracing 180° or 12 hours of right ascension, and the book also contains about ten charts N of the principal constellations, such, for instance, as shown in Fig. 5. Each of the charts K (see Fig. 4) is provided with a right ascension graduation K' and all stars on a line drawn from the center of the chart to the graduation K' have the right ascension indicated. Each chart N is provided with a right ascension graduation N' on the celestial equator (W. E.), and another right ascension graduation $N^3$ on the 21st parallel of south declination indicated on the graduation $N^2$, which extends both north and south of the celestial equator and is graduated to every 30 minutes of arc. By the aid of the graduations the navigator is aided in what parts of the heaven the stars on the charts are to be found. The chart N also gives the major points of the compass relative to Polaris, as will be readily understood by comparison of Fig. 5 with Fig. 4. The pivot B is considered the observer's point at the time.

It is understood that the star lines H represent the right ascension of the stars in the graduation G and are numbered to enable the navigator to refer to the star table shown in Fig. 3, and in which the navigator finds the right ascension for a particular star with more exactness than can be obtained from the graduation G. In addition the declination of the star is also given in the star table. Now after finding the star required, the navigator refers to the charts K, L or N and by the corresponding numerals can readily locate the star on the chart, and then by comparison with the heavens can readily locate the star required.

From the foregoing it will be seen that by the use of the apparatus described the navigator is enabled to dispense with a considerable amount of calculation, and can tell at a glance what stars will be the most favorably situated at any given time for making observations.

Having thus described our invention, we claim as new and desire to secure by Letters Patent:

1. A star finder, comprising two members, of which one is mounted to turn on the other, one of the members having on its face a circular graduation representing right ascension and radial lines numbered to correspond to numbers given to stars, and the other member having an annular graduation indicating the hours of the day and co-acting with the said right ascension graduation and the said radial lines.

2. A star finder, comprising a plate having on its face a circular graduation representing right ascension, and radial lines numbered to correspond to numbers given to stars, and a disk mounted to turn on the said plate and having an annular graduation indicating the hours of the day and co-acting with the graduation and radial lines of the said plate.

3. A star finder, comprising a plate having on its face a circular graduation representing right ascension and radial lines numbered to indicate stars, and a disk mounted to turn on the said plate and having annular concentric graduations co-operating with the graduation and lines on the said plate, one of the concentric graduations indicating the hours of the day and the other representing a correction.

4. A star finder, comprising two members, of which one is mounted to turn on the other, one of the members having on its face a circular graduation representing right ascension and radial lines numbered to correspond to numbers given to stars, and the other member having an annular graduation indicating the hours of the day and co-acting with the said right ascension graduation and the said radial lines, and a table containing the names of the principal stars and numbers on the said names and corresponding to the numbers on the said radial lines.

5. A star finder, comprising two members, of which one is mounted to turn on the other, one of the members having on its face a circular graduation representing right ascension and radial lines numbered to correspond to numbers given to stars, and the other member having an annular graduation indicating the hours of the day and co-acting with the said right ascension graduation and the said radial lines, and a table containing the names of the principal stars, their right ascension and declination, and numbers on the said names and corresponding to the numbers on the said radial lines.

6. A star finder, comprising a plate having an annular right ascension graduation and radial lines provided with numbers, a disk mounted to turn centrally on the said plate and having a graduation indicating the hours of the day and co-acting with the said right ascension graduation and the radial lines, and a table containing the names of the principal stars, their right ascension and declination, and numbers on the said names corresponding to the numbers on the radial lines.

7. A star finder, comprising a plate having an annular right ascension graduation and radial lines provided with numbers, a disk mounted to turn centrally on the said plate and having a graduation indicating the hours of the day and co-acting with the said right ascension graduation and the radial lines, a table containing the names of the principal stars, their right ascension and declination, and numbers on the said names corresponding to the numbers on the said radial lines, and degree graduations on the said disk, one for general correction and the other for Polaris correction.

8. A star finder, comprising a plate having an annular right ascension graduation and radial lines provided with numbers, a disk mounted to turn centrally on the said plate and having a graduation indicating the hours of the day and co-acting with the said right ascension and the radial lines, the said disk being divided into plus and minus quadrants, and a table containing the names of the principal stars, their right ascension and declination, and numbers on the said names corresponding to the numbers on the said radial lines.

9. A star finder, comprising a plate having an annular right ascension graduation and radial lines provided with numbers, a disk mounted to turn centrally on the said plate and having a graduation indicating the hours of the day and co-acting with the said right ascension graduation and the radial lines, and two correcting graduations, one for general correction and the other for Polaris correction.

In testimony whereof we have signed our names to this specification in the presence of two subscribing witnesses.

JOSEPH T. ROGERS.
WILLIAM H. RIDINGS.

Witnesses:
DONALD LAMONT,
CARL PHILLIPS.